United States Patent
Madour (10) Patent No.: US 6,990,088 B2
(45) Date of Patent: Jan. 24, 2006

(54) HANDOFF IN RADIO TELECOMMUNICATIONS NETWORKS

(75) Inventor: Lila Madour, Kirkland (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 883 days.

(21) Appl. No.: 09/924,516

(22) Filed: Aug. 9, 2001

(65) Prior Publication Data

US 2002/0021681 A1 Feb. 21, 2002

Related U.S. Application Data

(60) Provisional application No. 60/226,486, filed on Aug. 18, 2000.

(51) Int. Cl.
*H04Q 7/00* (2006.01)

(52) U.S. Cl. ............... 370/331; 370/335; 370/338; 370/342; 370/352; 455/436

(58) Field of Classification Search ........... 370/331, 370/335, 338, 342, 352; 455/439, 436
See application file for complete search history.

(56) References Cited

U.S. PATENT DOCUMENTS 6,834,050 B1 * 12/2004 Madour et al. ............. 370/392
6,834,190 B1 * 12/2004 Lee et al. .................... 455/436
2001/0050907 A1 * 12/2001 Madour et al. ............. 370/329

FOREIGN PATENT DOCUMENTS

| EP | 0 984 656 A2 | 8/2000 |
| WO | WO 00/05909 | 3/2000 |

OTHER PUBLICATIONS

Rajesh Bhalla, *Fast Handoff in CDMA2000 Wireless IP Networks—PP Interface Stage-2 and Stage-3 Descriptions*, 3GPP2-P00-20010212-007, Phoenix, AZ, Feb. 12, 2001.

* cited by examiner

*Primary Examiner*—Ricky Ngo
*Assistant Examiner*—Richard Chang
(74) *Attorney, Agent, or Firm*—Sandra Beauchesne; Ericsson Canada, Inc.

(57) ABSTRACT

The invention relates to an improved handoff method for mobile IP in a cdma2000 network. During handoff, the A10 connection between the Target PCF and the PDSN is pre-set-up, while the MS is still connected to a MSC, when the Target PCF receives the message from the Target BSC to set up the A8 connection. Furthermore, in the case of inter-PDSN handoff, a tunnel is established between the PDSNs, over which the PPP context eventually is transferred to the Target PDSN. The Target PDSN then sends a message to the MS triggering a re-registration with the HA. The Target PDSN takes over full responsibility for the MS when it receives the Mobile IP Result from the HA, and sends a message to the Serving PDSN to let the latter know that it can release all resources related to the MS.

23 Claims, 6 Drawing Sheets

HANDOFF IN RADIO TELECOMMUNICATIONS NETWORKS

PRIORITY STATEMENT UNDER 35 U.S.C. 119(e) & 37 C.F.R.S. 1.78

This non-provisional patent application claims priority based upon the prior U.S. provisional patent application entitled "Fast handoff of a packet data session", application No. 60/226,486 filed Aug. 18, 2000, in the name of MADOUR Lila.

BACKGROUND OF THE INVENTION

1. Technical Field of the Invention

The present invention relates to radio telecommunications, and particularly to handoff in radio telecommunications networks.

2. Description of Related Art

The possibility to handoff in a radio telecommunications network is obviously important; it is after all one of the features that make radio telecommunications mobile. Thus it can be seen that having good handoff mechanisms—taking care of different handoff situations—is important in these networks, and there is a drive for more efficient handoff mechanisms. It has for example become clear that at least some of the current handoff mechanisms in the cdma2000 (Code Division Multiple Access 2000) wireless standard (IS-835 and Access Network Standard IS-2001, release A) causes relatively long interruptions and data loss. Hence it is obvious that better handoff mechanisms are desired, particularly for cdma2000 that will be used as an example hereinafter, but also for other radio telecommunications technologies that can use a similar solution. The current invention provides such handoff mechanisms (hereinafter referred to as methods).

SUMMARY OF THE INVENTION

The present invention is directed to a method in a Packet Control Function (PCF) for participating in the set-up of a traffic path during mobile station (MS) handoff in a cdma2000 network that further comprises a Base Station Controller (BSC), and a Packet Data Serving Node (PDSN), where the BSC is the target BSC for the MS. The PCF sends an A10 Connection Request to the PDSN upon reception of an "A9—Set-up—A8" message from the BSC, and an "A9—Connect—A8" message to the BSC upon reception of a response from the PDSN.

The present invention is also directed to a Packet Control Function (PCF) for participating in the set-up of a traffic path during mobile station (MS) handoff in a cdma2000 network that comprises a Base Station Controller (BSC), and a Packet Data Serving Node (PDSN), and the BSC is the target BSC for the MS. The PCF comprises a reception unit for receiving an "A9—Set-up—A8" message from the BSC and an A10 Connection Result message from the PDSN, a transmission unit for sending an A10 Connection Request message to the PDSN and an "A9—Connect—A8" message to the BSC, and a computing unit, connected to the reception unit and the transmission unit, for analysing received messages and ordering the transmission of the message to the PDSN in response to reception of the message from the BSC and the message to the BSC in response to reception of the message from the PDSN.

The present invention is further directed to a method for setting up a traffic path during mobile station (MS) handoff in a cdma2000 network that further comprises a Base Station Controller (BSC), a Packet Control Function (PCF), and a Packet Data Serving Node (PDSN), wherein the MS is to hand off to the BSC. The BSC sends an "A9—Set-up—A8" message to the PCF that sends an A10 Connection Request to the PDSN. The PDSN sends an A10 Connection Result to the PCF that sends an "A9—Connect—A8" message to the BSC.

The invention is further directed to a system for setting up a traffic path during mobile station (MS) handoff in a cdma2000 network that further comprises a Base Station Controller (BSC), a Packet Control Function (PCF), and a Packet Data Serving Node (PDSN). The system comprises the BSC for sending "A9—Set-up—A8" messages to the PCF and receiving "A9—Connect—A8" messages from the PCF, the PDSN for receiving A10 Connection Requests from the PCF and sending A10 Connection Results to the PCF, and the PCF for sending an A10 Connection Request to the PDSN upon reception of an "A9—Set-up—A8" message from the BSC, and sending an "A9—Connect—A8" to the BSC upon reception of an A10 Connection Result from the PDSN.

The invention is further directed to a method for changing the routing of traffic to a mobile station (MS) in a cdma2000 network that further comprises a first and a second Packet Data Serving Node (PDSN) and a Home Agent (HA). The HA has registered that data traffic for the MS is to be sent to the first PDSN for further routing to the MS. The MS is in the domain of the second PDSN, and the MS and the first PDSN store Point-to-Point Protocol (PPP) context information and have a PPP connection. There is a tunnel between the first and second PDSN through which data traffic received by the first PDSN for the MS is sent. The first PDSN transfers PPP context information relating to the MS to the second PDSN method. Upon reception of all the necessary PPP context information, the second PDSN sends an Agent Advertisement to the MS that sends a Mobile IP (MIP) Re-registration message to the HA, which then changes the registration for the MS so that it indicates that data traffic for the MS should be sent to the second PDSN. The HA also sends a MIP Result message to the second PDSN to acknowledge the re-registration message, and the second PDSN establishes a PPP connection to the MS using the stored PPP context information.

The invention is further directed to a system for changing the routing of traffic to a mobile station (MS) in a cdma2000 network. The system comprises a first and a second Packet Data Serving Node (PDSN) and a Home Agent (HA). The MS has handed off to the domain of the second PDSN, and the MS stores Point-to-Point Protocol (PPP) context information and has a PPP connection with the first PDSN. The HA is for registering to which PDSN data traffic for the MS is to be sent for further routing to the MS, changing the registration for the MS upon reception of a Mobile IP (MIP) Re-registration message from the MS, and sending a MIP Result message to the second PDSN to acknowledge the Re-registration message. The first PDSN is for storing PPP context information, sending data traffic for the MS through a tunnel to the second PDSN, and transferring PPP context information relating to the MS to the second PDSN. The second PDSN is for receiving the PPP context information from the first PDSN, storing the PPP context information, sending an Agent Advertisement to the MS, forwarding a MIP Re-registration message from the MS to the HA, and establishing a PPP connection to the MS using the stored PPP context information.

The invention is also directed to a Packet Data Serving Node (PDSN) in a cdma2000 network that comprises a second PDSN storing Point-to-Point Protocol (PPP) context information relating to a Mobile Station (MS) that has handed off to the first PDSN, and a Home Agent (HA) that has registered that the MS is served by the second PDSN. The PDSN comprises a reception unit for receiving the PPP context information from the second PDSN and a Mobile IP (MIP) Re-registration message from the MS, a memory for storing the PPP context information, a transmission unit for sending an Agent Advertisement to the MS and forwarding the MIP Re-registration message to the HA, and a connection establishment unit for establishing a PPP connection to the MS using the stored PPP context information.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

Figure 1:
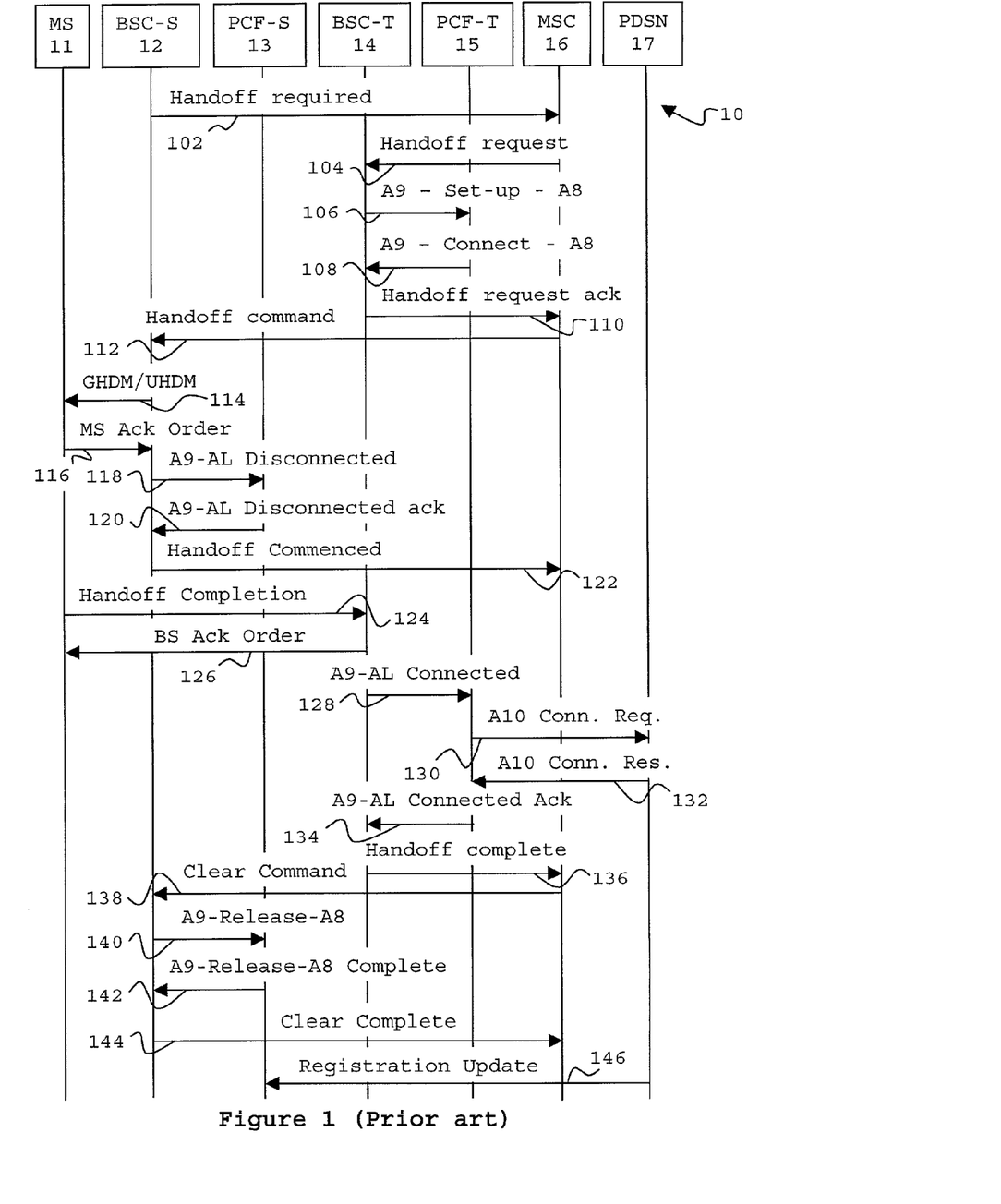
FIG. 1 depicts a signal flow chart illustrating a prior art cdma2000 handoff method.

Reference is now made to the Drawings, where FIG. 1 depicts a signal flow chart illustrating a prior art cdma2000 handoff method. The description of the method is simplified as both the method and the messages are well known in the art.

FIG. 1 shows a simplified cdma2000 network 10 that comprises a mobile station (MS) 11 that is in a cell (not shown) served by a Serving Base Station Controller (BSC-S) 12 that operates together with a Serving Packet Control Function (PCF-S) 13. The network also comprises a Target Packet Control Function (PCF-T) 15 operating with a Target Base Station Controller (BSC-T) 14 directing the cell (not shown) that the MS 11 will be handed off to. There is also a Mobile Switching Centre (MSC) 16 that among other things is in charge of handoffs, and a Packet Data Serving Node (PDSN) 17 that manages access to network resources. A PCF is the packet interface between a BSC and a PDSN, and among other things buffer data going to the BSC.

When the MS 11 is to be handed off, the Serving BSC 12 sends a Handoff Required message 102 to the MSC 16. This message 102 comprises cell information to help with the handoff decision and the PDSN's 17 address. The MSC 16 then sends a Handoff Request message 104, comprising the PDSN's 17 address, to the Target BSC 14 to tell the latter that the MS 11 is about to be handed off to this Target BSC 14. The Target BSC 14 sends an "A9— Set-up—A8" message 106, also comprising the PDSN's 17 address, to the Target PCF 15 to set up an A8 connection between them. It is important to remember that the A8 connection and other connections hereinafter, except the connection between the MS and the BSC, are logical; the physical connections are already established, although not necessarily directly. An A8 connection is specific to a certain MS. In response to this message 106, the Target PCF 15 sends an "A9—Connect—A8" message 108 to the Target BSC 14 to acknowledge the establishment of the connection between the BSC 14 and the PCF 15 for the MS 11. When this message is received, the Target BSC 14 acknowledges the Handoff Request 104 with a Handoff Request Ack message 110 that it sends to the MSC 16, informing that it is ready to receive the MS 11. The MSC 16 then sends a Handoff Command message 112 to the Serving BSC 12 to instruct it to start handing off the MS 11.

The Serving BSC 12 then sends a General Handoff Direction Message/Universal Handoff Direction Message (GHDM/UHDM) message 114 to the MS 11 to order it to hand off, and more or less concurrently an "A9—AL Disconnected" message 118 to the Serving PCF 13 to inform that the Air Link (AL) has been disconnected and that the Serving BSC 12 therefore has no connection to the MS 11. The MS 11 acknowledges the GHDM/UHDM message 114 with a MS Ack Order 116 and the Serving PCF 13 acknowledges the received message 118 with an "A9—AL Disconnected Ack" message 120. The Serving BSC 12 also sends a Handoff Commenced message 122 to the MSC 16.

The MS 11 sends a Handoff Completion message 124 to inform the Target BSC 14 that the MS 11 is in the area of the Target BSC 14, which is an equivalent of saying "I'm here!". The Target BSC 14 acknowledges with a BS Ack Order message 126 and also sends a "A9—AL Connected" 128 to the Target PCF 15 to inform that the air link has been established and that the Target PCF 15 can start to send data to the Target BSC 14 for further delivery to the MS 11. An A10 Connection, which is a connection between the Target PCF 15 and the PDSN 17 for the MS 11, is then set up by sending from the Target PCF 15 to the PDSN 17 an A10 Connection Request message 130 to which the PDSN 17 responds with an A10 Connection Result message 132. The Target PCF 15 then sends an "A9—AL Connected Ack" message 134 to the Target BSC 14 that in turn sends a Handoff Complete message 136 to the MSC 16 to inform that the MS 11 now is successfully handed off.

When the MSC 16 has been informed that the handoff is successful it sends a Clear Command 138 to the Serving BSC 12 to initiate a release of the resources that are no longer needed. Upon reception of this command 138 the Serving BSC sends an "A9—Release—A8" message 140 to the Serving PCF 13 to release the A8 connection. When this connection is dismantled, the Serving PCF 13 sends an "A9—Release—A8 Complete" message 142 to the Serving BSC 12 that in turn, through a Clear Complete message 144, informs the MSC 16 that the Clear Command 138 has been performed. The PDSN 17 also sends to the Serving PCF 13 a Registration Update message 146 with the lifetime set to zero, which dismantles the A10 connection between the nodes.

At this point, the MS 11 has handed off from the Serving BSC 12 to the Target BSC 14, connections have been set up to the corresponding PCF 15 and the PDSN 17, and the resources that are no longer needed have been released. A problem with this method however is, as previously mentioned, that it causes relatively long interruptions and data loss.

Figure 2:
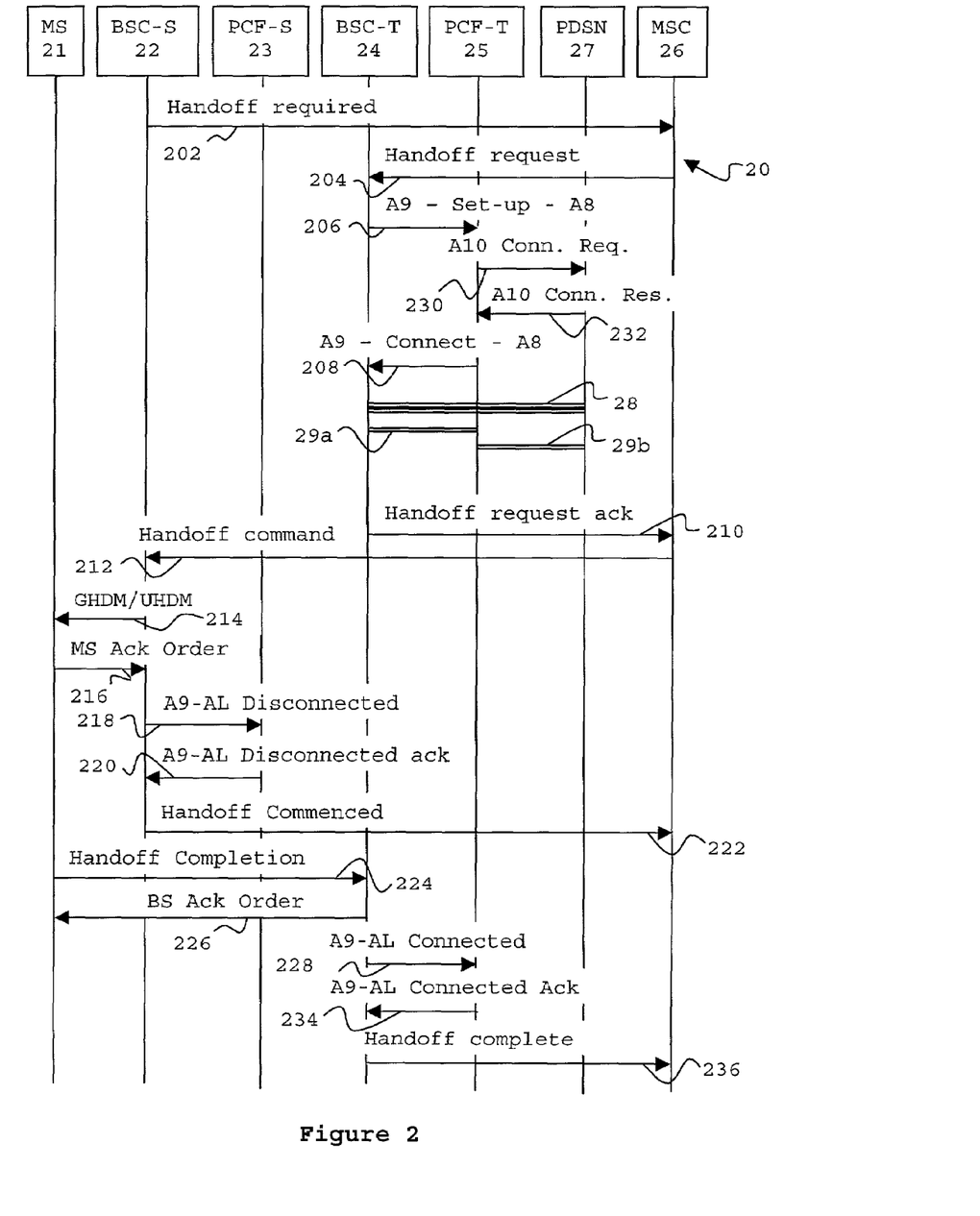
FIG. 2 depicts a signal flow chart illustrating a first embodiment of an improved cdma2000 handoff method according to the invention.

FIG. 2 shows a signal flow chart illustrating a first embodiment of an improved cdma2000 handoff method according to the invention. A comparison between FIG. 1 and FIG. 2 shows that the methods have certain common parts that are described in more detail in FIG. 1. Like the network 10 in FIG. 1, the network 20 in FIG. 2 comprises a MS 21, a Serving and a Target BSC 22 and 24 with a corresponding Serving and Target PCF 23 and 25, a MSC 26 and a PDSN 27. Similarly, the MS 21 is to be handed off from the Serving BSC 22 to the Target BSC 24.

As in FIG. 1, when a handoff is required the Serving BSC 22 sends a Handoff Required message 202 to the MSC 26 that sends a Handoff Request message 204 to the Target BSC 24 that upon reception of this Request 204 sends an "A9—Set-Up—A8" message 206 to the Target PCF 25. The embodiment of the method according to the invention does however save time, thereby making the handoff method more efficient, by performing a "pre-set-up of the A10 connection", i.e. setting up the A10 Connection 29b between the Target PCF 25 and the PDSN 27 while the MS 21 is still connected to the Serving BSC 22, instead of when the MS 21 does not have any network connection as in the prior art. Setting up the A10 connection 29b is done by sending from the Target PCF 25 to the PDSN 27 an A10 Connection Request 230 to which the PDSN 27 responds with an A10 Connection Result 232.

The method is then for a while is similar to the method described in FIG. 1. The Target PCF sends an "A9—Connect—A8" message 208 to the Target BSC 24. A traffic path 28, comprising an A8 connection 29a and an A10 connection 29b, is now set up from the Target BSC 24 to the PDSN 27. The Target BSC 24 then acknowledges the Handoff Request 204 to the MSC 26 with a Handoff Request Ack 210. The MSC 26 then sends a Handoff Command 212 to the Serving BSC 22 that sends a "GHDM/UHDM" message 214 to the MS 21 and an "A9—AL Disconnected" message 218 to the Serving PCF 23. The MS 21 responds with a MS Ack Order message 216 and the Serving PCF 23 acknowledges with an "A9—AL Disconnected Ack" message 220. It should be noted that the order of these messages could be changed without affecting the invention; e.g. the "A9—AL Disconnected" message 218 could be sent before the GHDM/UHDM message 214, and the responses could arrive in different order. The Serving BSC 22 sends a Handoff Commenced message 222 to the MSC 26. The MS 21 sends a Handoff Completion message 224 to the Target BSC 24 that acknowledges with a BS Ack Order message 226 and sends an "A9—AL Connected" message 228 to the Target PCF 25.

As can be seen, this is the point where the A10 Connection was set up in the method in FIG. 1. It is worth pointing out again that the set-up of this connection was commenced earlier (hence pre-set-up) in the embodiment of the method according to the invention, thereby saving time leading to less interruption and data loss as the MS 21 is disconnected from the network 20 a shorter time. The embodiment of the method according the invention continues, similar to the method in FIG. 1 (after the A10 Connection Set-Up), with an "A9—AL Connected Ack" message 234 sent from the Target PCF 25 to the Target BSC 24 that sends a Handoff Complete message 236 to the MSC 26. The clearing of resources that are no longer used follows the same steps as in FIG. 1, but as it is not part of the invention, it is not shown in FIG. 2 for reasons of brevity and clarity.

The method in FIG. 2 described handoff from a Serving BSC to a Target BSC using the same PDSN, i.e. intra-PDSN handoff. In the case of inter-PDSN handoff, i.e. from one PDSN to another PDSN, the handoff method is slightly different, as will be described in the following figures.

Figure 3A:
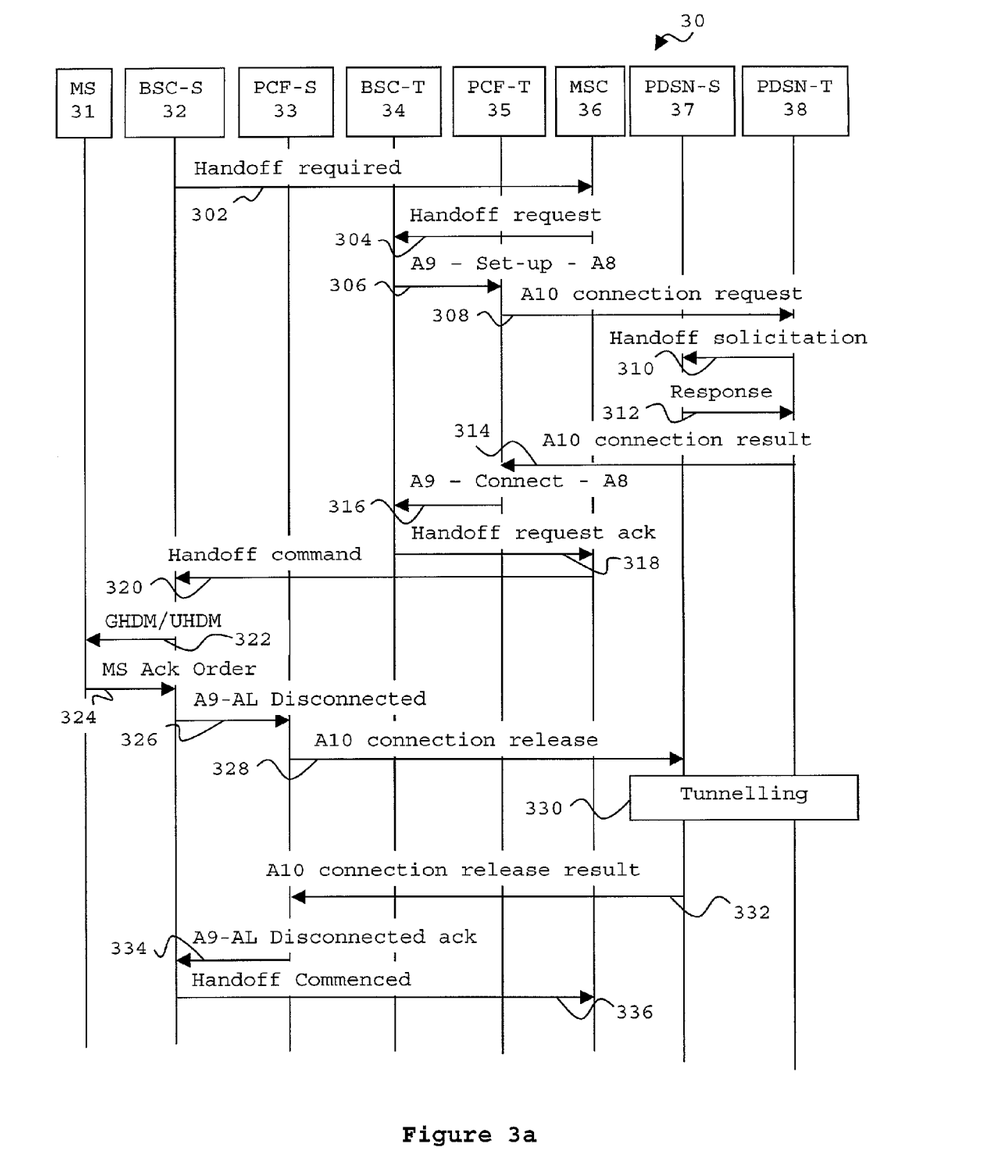
FIGS. 3a and 3b together depict a signal flow chart illustrating a second embodiment of an improved cdma2000 handoff method according to the invention.
Figure 3B:
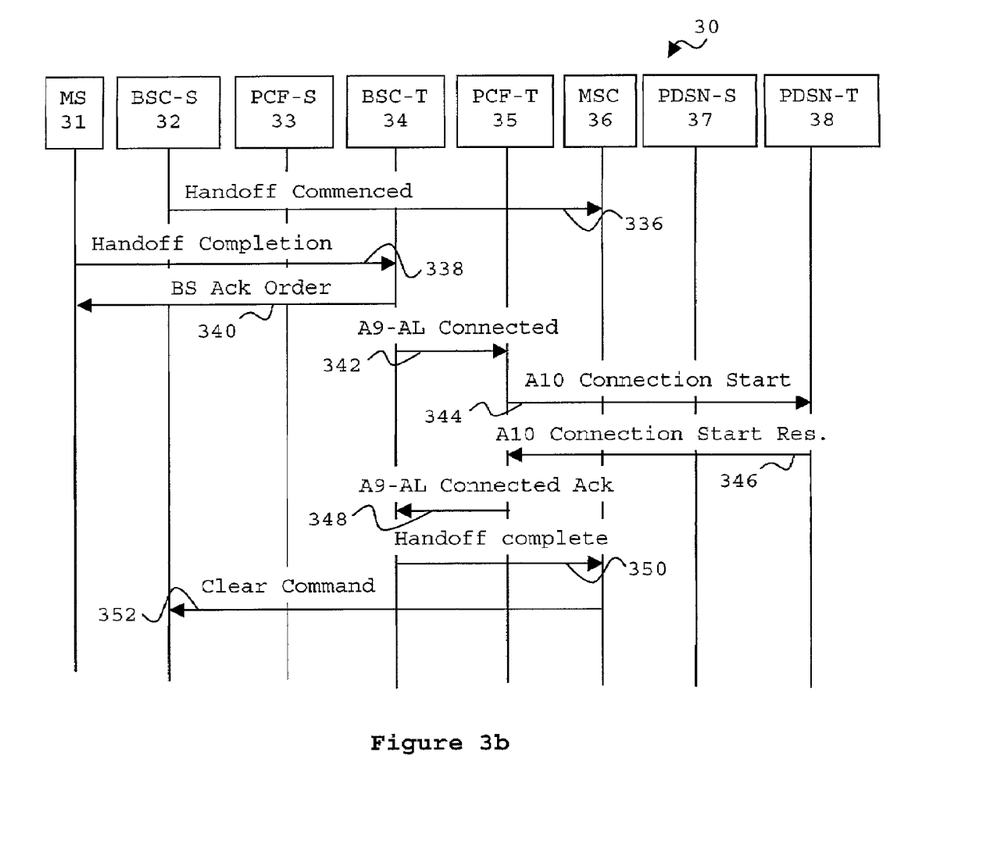

FIGS. 3a and 3b together depict a signal flow chart illustrating a second embodiment of an improved cdma2000 handoff method—inter-PDSN handoff—according to the invention. FIG. 3a shows the first part of the embodiment of the method according to the invention and FIG. 3b shows the second part. FIGS. 3a and 3b may be referred to together as FIG. 3. Where certain messages and steps have been described hereinbefore and are similar in FIG. 3 and another figure, they will only be described briefly in FIG. 3.

FIG. 3 shows a network 30 comprising a MS 31, a Serving BSC 32 and a Serving PCF 33 within the realm (also called domain) of a Serving PDSN 37, a Target BSC 34 and a Target PCF 35 within the realm of a Target PDSN 38, and a MSC 36. The MS 31 is to be handed off from the Serving BSC 32 to the Target BSC 34, and hence in a sense also from the Serving PDSN 37 to the Target PDSN 38.

As in FIG. 2, the method starts with the Serving BSC 32 sending a Handoff Required message 302 to the MSC 36 that sends a Handoff Request 304 to the Target BSC 34, which in turn sends an "A9—Set-Up—A8" message 306 to the Target PCF 35 that sends an A10 Connection Request 308 to the Target PDSN 38.

At this point, however, upon reception of this request 308, the Target PDSN 38 sends a Handoff Solicitation message 310 to the Serving PDSN 37 that sends a Response 312 comprising information to enable the establishment of security contexts, about transfer service types, Quality of Service parameters etc. The Target PDSN 38 then sends an A10 Connection Result message 314 to the Target PCF 35. The message 314 comprises one of the Target PDSN's 38 IP addresses for further propagation to the Serving PDSN 37. If the signalling and the bearer planes are separated, then the control signals are sent to a different place than the traffic. In this case, the Target PDSN 38 sends a signalling IP address to the Serving PDSN 37 in the Handoff solicitation 310, and a traffic IP address in the A10 Connection Result message 314.

After this message 314, the method is for a few messages similar to the method described in FIG. 2. The Target PCF 35 sends an "A9—Connect—A8" message 316 to the Target BSC 34 that in turn sends a Handoff Request Ack message 318 to the MSC 36. The MSC 36 then sends a Handoff Command 320 to the Serving BSC 32 that sends a GHDM/UHDM message 322 to the MS 31 and an "A9—AL Disconnected" message 326 to the Serving PCF 33. The MS 31 responds to the message 322 with a MS Ack Order 324.

Now, differing from the method in FIG. 2, the Serving PCF 33 sends an A10 Connection Release message 328, comprising the IP address sent by the Target PDSN 38 in the A10 Connection Result 314, to the Serving PDSN 37 to release the A10 connection between the nodes. The Serving PDSN 37 may then, using the IP address provided by the Target PDSN 38 in the A10 Connection Result message 314, send data through a tunnel to the Target PDSN 38, step 330, and responds to the Serving PCF 33 with an A10 Connection Release Result message 332. It should again be noted that the tunnel is logical.

Then the method is once more similar to the one in FIG. 2. The Serving PCF 33 sends an "A9—AL Disconnected Ack" message 334 to the Serving BSC 32 that sends a Handoff Commenced message 336 to the MSC 36. The MS 31 sends a Handoff Completion message 338 to the Target BSC 34 that responds with a BS Ack Order 340 and sends an "A9—AL Connected" message 342 to the Target PCF 35.

Once more, the method is inter-PDSN handoff specific for a few messages. The Target PCF 35 sends an A10 Connection Start message 344 to the Target PDSN 38 that responds with an A10 Connection Start Result 346. With this message 344, the Target PCF 35 informs the Target PDSN 38 that the MS 31 is on a traffic channel and that the Target PDSN 38 therefore can start sending data for the MS 31. Up until this point, the Target PDSN 38 buffers any data it received for transport to the MS 31.

Finally, the rest of the method is similar to the one in FIG. 2. The Target PCF 35 sends an "A9—AL Connected Ack" message 348 to the Target BSC 34 that sends a Handoff Complete message 350 to the MSC 36. The latter message 350 triggers the releasing of resources as is indicated by the Clear Command 352 sent to the Serving BSC 32, although the rest is not shown for reasons of clarity. After this the MS 31 has completed the handoff.

Figure 4A:
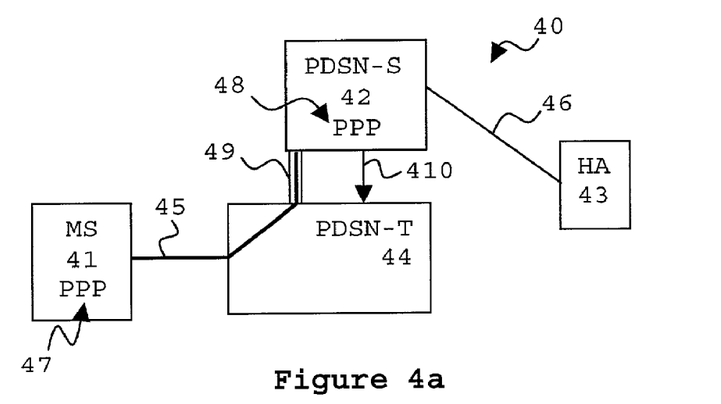
FIGS. 4a–4c depict block charts that together illustrate an optional continuation of the second embodiment of the handoff method according to the invention.
Figure 4B:
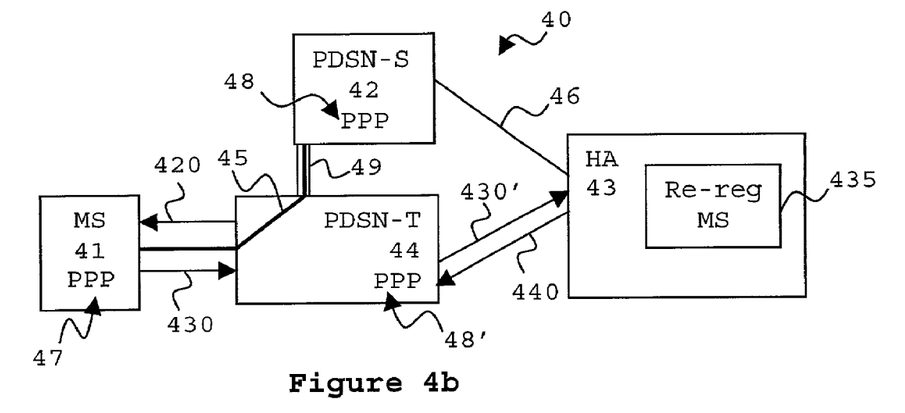
Figure 4C:
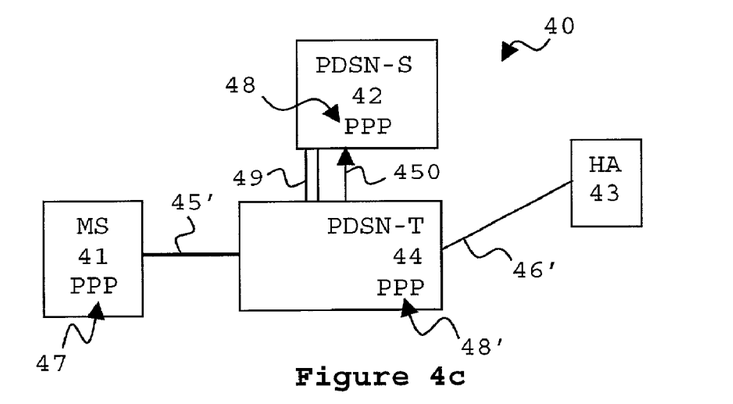

FIGS. 4a–4c (that together may be referred to as FIG. 4) depict simplified block charts of a telecommunications network, where the figures together illustrate an optional continuation of the second embodiment of the handoff method according to the invention.

FIG. 4 shows a radio telecommunications network 40, such as a cdma2000 network. The network 40 comprises a MS 41, a Serving PDSN 42, a Home Agent (HA) 43, and a Target PDSN 44. The to HA 43 among other things keeps track of the whereabouts of the MS 41 so that when other nodes (not shown) want to send data to the MS 41, they ask the HA 43 for the current address of the MS 41. As can be seen, the PCFs, the BSCs and the MSC have been omitted for reasons of clarity.

FIG. 4a shows the network after handoff according to the method described in FIG. 3. The MS 41 is now connected to the Target PDSN 44 that through a tunnel 49 (indicated by two parallel lines) forwards data between the MS 41 and the Serving PDSN 42 that still is registered as the PDSN serving the MS 41 in the HA 43 (indicated by 46). In addition, the Serving PDSN 42 also has a PPP connection 45 with the MS 41, via the Target PDSN 44, to which end the MS 41 and the Serving PDSN 42 have stored PPP context information 47 and 48 respectively.

Although the MS 41 has handed off, as can be seen from the figure, two PDSNs 42 and 44 are involved at this point, which may be acceptable to some network operators, while others may find it unacceptable. Thus the inter-PDSN handoff may continue in order to render the situation acceptable.

However, establishing a PPP connection between the MS 41 and the Target PDSN 44 takes time and leads to interruption of service. The Serving PDSN 42 therefore starts to transfer, in one or more messages 410, the PPP context to the Target PDSN 44 that stores this PPP context information 48' (see FIG. 4b).

FIG. 4b shows the network when the Target PDSN 44 has received and stored the PPP context information 48'. At this point, it is still the Serving PDSN 42 that receives the traffic, as the HA 43 thinks that traffic to the MS 41 should be sent there. The Target PDSN 44 then sends an Agent Advertisement 420 to the MS 41 prompting the latter to respond with a Mobile IP (MIP) Re-registration message 430 that is forwarded to the HA 43 as message 430'. Upon reception of the Re-registration message 430', the HA 43 changes the information about where to send data for the MS 41 from the Serving PDSN 42 to the Target PDSN 44, action 435, and sends a MIP Result message 440 to the Target PDSN 44 to acknowledge the Re-registration 430'. The Target PDSN 44 then enables a PPP connection 45' (see FIG. 4c) to the MS 41 using the stored PPP context information 48'. From this point on, the names Serving and Target PDSNs may be said to be misnomers as the "Serving" PDSN 42 no longer serves the MS 41 and the "Target" PDSN 44 fully has taken over the role of the Serving PDSN 42.

FIG. 4c shows the network when the Target PDSN 44 has received the MIP Result message 440. The MS 41 and the Target PDSN 44 have a PPP connection 45' and the HA 43 has the Target PDSN 44 registered as the node through which data to the MS 41 should be sent (indicated by 46').

There are still some resources used unnecessarily, as the Serving PDSN 42 does not know that it is no longer needed, and for example keeps the PPP context information 48 stored and the empty tunnel 49 is still ready. The Target PDSN 44 sends an Update message 450 to the Serving PDSN that thereafter releases all resources related to the MS 41.

When all this is done, not only has the MS handed off from one BSC to another, but also the resource usage has been optimised so that only one PDSN is used.

Figure 5:
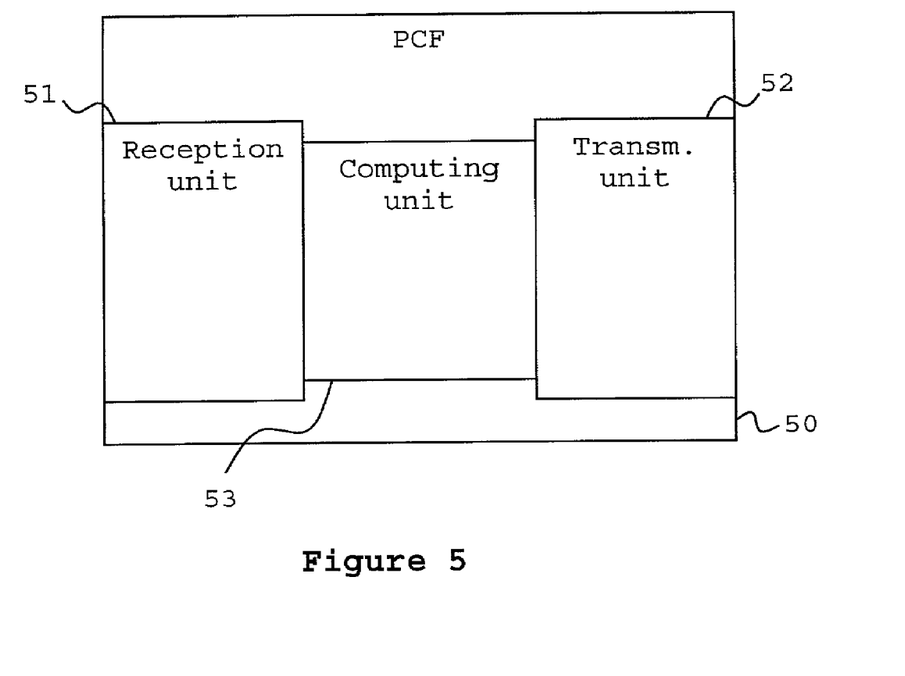
FIG. 5 depicts a block chart of a Packet Control Function according to the invention.

FIG. 5 depicts a block chart of a Packet Control Function (PCF) 50 according to the invention. The PCF 50 comprises a reception unit for receiving among other things "A9—Set-up—A8" messages from BSCs and A10 Connection Result messages from the PDSN it is associated with. The PCF 50 also comprises a transmission unit 52 for sending among other things A10 Connection Request messages to the PDSN it is associated with and "A9—Connect—A8" messages to BSCs. The PCF 50 further comprises a computing unit 53, connected to the reception unit and the transmission unit, for among other things analysing received messages and ordering the transmission of an A10 Connection Request message in response to reception of an "A9—Set-up—A8" message, and an "A9—Connect—A8" message in response to reception an A10 Connection Result message.

It is possible that the reception unit 51, or the transmission unit 52, or both the reception unit 51 and the transmission unit 52, comprise more than one physical receiver or transmitter. It is for example possible to have one transceiver (i.e. transmitter and receiver) towards the PDSN and a second transceiver towards a BSC.

Figure 6:
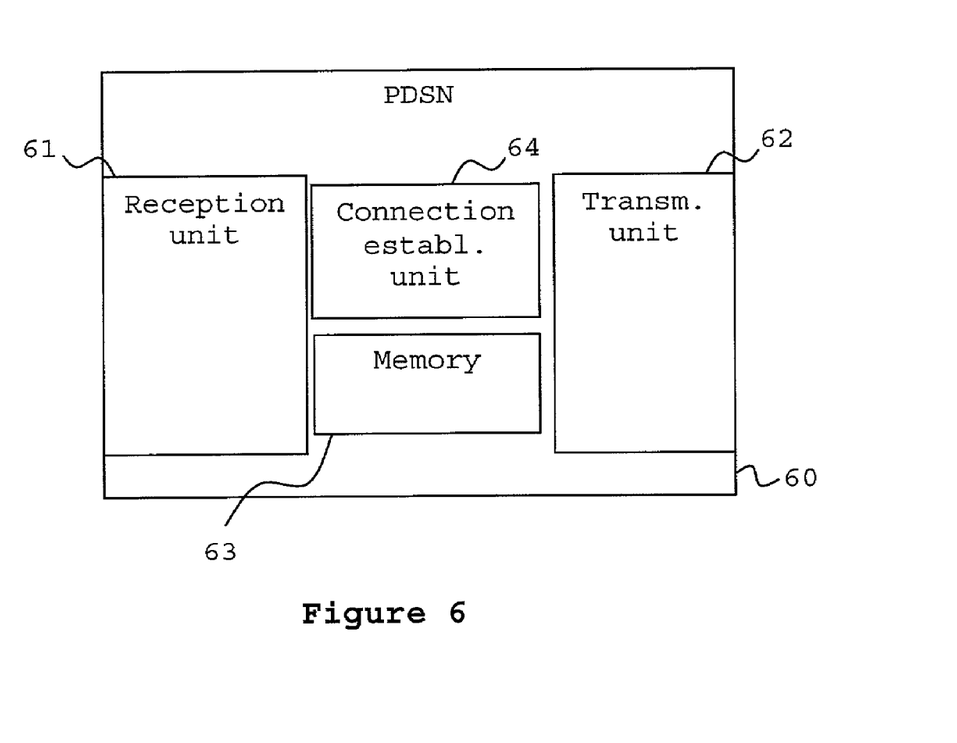
FIG. 6 depicts a block chart of a Packet Data Serving Node according to the invention.

FIG. 6 shows a block chart of a Packet Data Serving Node (PDSN) 60 for use in the embodiment of the method described in FIG. 4. The PDSN 60 comprises a reception unit 61 for receiving PPP context information from another PDSN and a Mobile IP (MIP) Re-registration message from a MS. The PDSN 60 also comprises a memory 63 for storing the PPP context information, and a transmission unit 62 for sending an Agent Advertisement to the MS and for forwarding the MIP Re-registration message to a HA. The PDSN 60 further comprises a connection establishment unit 64 for establishing a PPP connection to the MS using the stored PPP context information.

The transmission unit 62 is further for sending an Update message to the other PDSN to initiate the release of resources related to the MS that are used by the other PDSN.

Thus it can be seen that the present invention provides embodiments of a handoff method that decreases service interruption and is economical with network resources.

Although several preferred embodiments of the methods, systems and nodes of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method in a Packet Control Function (PCF) for participating in the set-up of a traffic path during mobile station (MS) handoff in a cdma2000 network, wherein the network further comprises a first Base Station Controller (BSC) that is a target BSC for the MS and a second Base Station Controller (BSC) that is a source BSC initiating a handoff for the MS, and a Packet Data Serving Node (PDSN), the method comprising the steps of:
   upon reception of an "A9—Set-up—A8" message from the target BSC, sending an A10 Connection Request to the PDSN; and
   upon reception of a response from the PDSN, sending an "A9 —Connect—A8" message to the BSC,
   wherein the steps are performed in order to establish a connection for the MS between the target BSC and the PDSN while the MS has still a connection with the source BSC.

2. A Packet Control Function (PCF) for participating in the set-up of a traffic path during mobile station (MS) handoff in a cdma2000 network, wherein the network further comprises a first Base Station Controller (BSC) that is a target BSC for the MS and a second Base Station Controller (BSC) that is a source BSC initiating a handoff for the MS, and a Packet Data Serving Node (PDSN), the PCF comprising:
   a reception unit for receiving:
      an "A9—Set-up—A8" message from the target BSC; and
      an A10 Connection Result message from the PDSN;
   a transmission unit for sending:
      an A10 Connection Request message to the PDSN; and
      an "A9—Connect—A8" message to the target BSC; and
   a computing unit, connected to the reception unit and the transmission unit, for:
      analysing received messages; and
      ordering the transmission of:
         the message to the PDSN in response to reception of the message from the target BSC; and
         the message to the target BSC in response to reception of the message from the PDSN,
   wherein the units are employed in order to establish for the MS a connection between the target BSC and the PDSN while the MS has still a connection with the source BSC.

3. A method for setting up a traffic path during mobile station (MS) handoff in a cdma2000 network, wherein the network further comprises a target Base Station Controller (BSC), a Packet Control Function (PCF), and a Packet Data Serving Node (PDSN), wherein the MS is to hand off to the target BSC from a source Base Station Controller (BSC), the method comprising the steps of:
   sending an "A9—Set-up—A8" message from the target BSC to the PCF;
   upon reception of the "A9—Set-up—A8" message, sending an A10 Connection Request from the PCF to the PDSN;
   sending an A10 Connection Result from the PDSN to the PCF; and
   upon reception of the A10 Connection Result, sending an "A9—Connect—A8" message from the PCF to the target BSC,
   in order to establish for the MS a connection between the target BSC and the PDSN while the MS has still a connection with the source BSC.

4. The method according to claim 3, wherein the network further comprises a Mobile Switching Centre (MSC), and the step of sending an "A9—Set-up—A8" message from the target BSC to the PCF is preceded by the step of sending a Handoff Request from the MSC to the target BSC.

5. The method according to claim 4, wherein the target BSC is a first BSC and the network further comprises the source BSC for performing the step of sending a Handoff Request from the MSC to the target BSC being preceded by the step of sending a Handoff Required message from the source BSC to the MSC.

6. The method according to claim 3, wherein the MS has an active air link with the source BSC while the steps of the method are performed.

7. The method according to claim 3, wherein the PDSN is a first PDSN and the network further comprises a second PDSN, wherein the method further comprises, upon reception by the first PDSN of the A10 Connection Request and before the step of sending an A10 Connection Result from the PDSN to the PCF, the steps of:
   sending a Handoff Solicitation message from the first PDSN to the second PDSN; and
   sending a Response from the second PDSN to the first PDSN.

8. The method according to claim 7, wherein the Handoff Solicitation comprises the IP address to which the first PDSN wants to receive messages from the second PDSN.

9. The method according to claim 8, wherein the IP address is a signalling IP address, and the A10 Connection Result comprises a traffic IP address on which the PDSN wants to receive traffic intended for the MS.

10. The method according to claim 3, wherein the A10 Connection Result comprises an IP address on which the PDSN wants to receive traffic intended for the MS.

11. A system for setting up a traffic path during mobile station (MS) handoff in a cdma2000 network, the network further comprising a target Base Station Controller (BSC), a Packet Control Function (PCF), and a Packet Data Serving Node (PDSN), wherein the MS is hand off to the target BSC from a source BSC and, wherein the system comprises:
   the target BSC for sending "A9—Set-up—A8" messages to the PCF and receiving "A9—Connect—A8" messages from the PCF;
   the PDSN for receiving A10 Connection Requests from the PCF and sending A10 Connection Results to the PCF; and
   the PCF for sending an A10 Connection Request to the PDSN upon reception of an "A9—Set-up—A8" message from the target BSC, and sending an "A9—Connect—A8" message to the target BSC upon reception of an A10 Connection Result from the PDSN,
   in order to establish for the MS a connection between the target BSC and the PDSN while the MS has still a connection with the source BSC.

12. The system according to claim 11, wherein the system further comprises a Mobile Switching Centre (MSC) for sending a Handoff Request from the MSC to the target BSC.

13. The system according to claim 12, wherein the system further comprises the source BSC for sending a Handoff Required message from the source BSC to the MSC, and the MSC further is for receiving this message.

14. The system according to claim 11, wherein the PDSN is a first PDSN and the system further comprises a second PDSN, wherein first PDSN further is for sending a Handoff Solicitation message to the second PDSN, and the second PDSN is for sending a Response to the first PDSN.

15. The system according to claim 14, wherein the first PDSN further is for sending an IP address to which the first PDSN wants to receive messages from the second PDSN in the Handoff Solicitation.

16. The system according to claim 15, wherein the IP address is a signalling IP address, and the first PDSN further is for sending a traffic IP address to which the PDSN wants to receive traffic intended for the MS in the A10 Connection Result.

17. The system according to claim 11, wherein the PDSN further is for sending in the A10 Connection Result an IP address to which the PDSN wants to receive traffic intended for the MS.

18. A method for changing the routing of traffic to a mobile station (MS) in a cdma2000 network, the network further comprising a first and a second Packet Data Serving Node (PDSN) and a Home Agent (HA), wherein the HA has registered that data traffic for the MS is to be sent to the first PDSN for further routing to the MS, the MS is in the domain of the second PDSN, the MS and the first PDSN store Point-to-Point Protocol (PPP) context information and have a PPP connection, and there is a tunnel between the first and second PDSN through which data traffic received by the first PDSN for the MS is sent, the method comprising the steps of:
   transferring PPP context information relating to the MS from the first PDSN to the second PDSN;
   upon reception of all the necessary PPP context information, sending an Agent Advertisement from the second PDSN to the MS;
   sending a Mobile IP (MIP) Re-registration message from the MS to the HA;
   changing, upon reception of the MIP Re-registration message, by the HA the registration for the MS so that it indicates that data traffic for the MS should be sent to the second PDSN;
   sending a MIP Result message from the HA to the second PDSN to acknowledge the re-registration message; and
   establishing by the second PDSN a PPP connection to the MS using the stored PPP context information.

19. The method according to claim 18, further comprising, after the step of enabling by the second PDSN a PPP connection to the MS, the step of sending an Update message from the second PDSN to the first PDSN to initiate the release of resources related to the MS that are used by the first PDSN.

20. A system for changing the routing of traffic to a mobile station (MS) in a cdma2000 network, the system comprising a first and a second Packet Data Serving Node (PDSN) and a Home Agent (HA), wherein the MS has handed off to the domain of the second PDSN, and the MS stores Point-to-Point Protocol (PPP) context information and has a PPP connection with the first PDSN, wherein:

the HA is for:
   registering to which PDSN data traffic for the MS is to be sent for further routing to the MS;
   changing the registration for the MS upon reception of a Mobile IP (MIP) Re-registration message from the MS; and
   sending a MIP Result message to the second PDSN to acknowledge the Re-registration message; and
the first PDSN is for:
   storing PPP context information;
   sending data traffic for the MS through a tunnel to the second PDSN; and
   transferring PPP context information relating to the MS to the second PDSN; and
the second PDSN is for:
   receiving the PPP context information from the first PDSN;
   storing the PPP context information;
   sending an Agent Advertisement to the MS;
   forwarding a MIP Re-registration message from the MS to the HA; and
   establishing a PPP connection to the MS using the stored PPP context information.

21. The system according to claim 20, wherein the second PDSN further is for sending an Update message to the first PDSN to initiate the release of resources related to the MS that are used by the first PDSN.

22. A Packet Data Serving Node (PDSN) in a cdma2000 network, wherein the network comprises a second PDSN storing Point-to-Point Protocol (PPP) context information relating to a Mobile Station (MS) that has handed off to the first PDSN, and a Home Agent (HA) that has registered that the MS is served by the second PDSN, the PDSN comprising:
   a reception unit for receiving:
      the PPP context information from the second PDSN; and
      a Mobile IP (MIP) Re-registration message from the MS;
   a memory for storing the PPP context information;
   a transmission unit for:
      sending an Agent Advertisement to the MS; and
      forwarding the MIP Re-registration message to the HA; and
   a connection establishment unit for establishing a PPP connection to the MS using the stored PPP context information.

23. The PDSN according to claim 22, wherein the transmission unit further is for sending an Update message to the second PDSN to initiate the release of resources related to the MS that are used by the second PDSN.

* * * * *